United States Patent
Boubez et al.

(10) Patent No.: US 8,712,886 B2
(45) Date of Patent: Apr. 29, 2014

(54) APPARATUS AND METHOD FOR CATEGORIZING SERVICES USING CANONICAL SERVICE DESCRIPTIONS

(75) Inventors: Toufic Boubez, Apex, NC (US); Stephen L. Burbeck, Cary, NC (US); James B. Casler, Apex, NC (US); Stephen G. Graham, Chapel Hill, NC (US); Maryann Hondo, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 4133 days.

(21) Appl. No.: 09/758,112

(22) Filed: Jan. 3, 2001

(65) Prior Publication Data

US 2002/0087340 A1  Jul. 4, 2002

(51) Int. Cl.
*G06Q 40/00* (2012.01)
(52) U.S. Cl.
USPC .......................................... 705/35; 705/26.1
(58) Field of Classification Search
USPC ................... 705/26, 28, 29, 35, 37, 27, 26.1
See application file for complete search history.

(56) References Cited

U.S. PATENT DOCUMENTS

| | | |
|---|---|---|
| 5,241,671 A | 8/1993 | Reed |
| 5,534,975 A | 7/1996 | Stefik et al. |
| 5,615,341 A | 3/1997 | Agrawal et al. |
| 5,621,201 A | 4/1997 | Langhans et al. |
| 5,778,367 A | 7/1998 | Wesinger, Jr. et al. |
| 5,799,151 A | 8/1998 | Hoffer |
| 5,802,508 A | 9/1998 | Morgenstern ................. 706/55 |
| 5,867,799 A | 2/1999 | Lang et al. ...................... 707/1 |
| 5,924,077 A | 7/1999 | Beach et al. |
| 5,933,816 A | 8/1999 | Zeanah et al. |
| 5,949,977 A | 9/1999 | Hernandez |
| 5,970,120 A | 10/1999 | Kasrai |
| 5,970,475 A | 10/1999 | Barnes et al. |
| 6,038,668 A | 3/2000 | Chipman et al. |
| 6,044,205 A | 3/2000 | Reed et al. ............... 395/200.31 |
| 6,064,979 A | 5/2000 | Perkowski ..................... 705/26 |
| 6,081,788 A | 6/2000 | Appleman et al. |
| 6,545,209 B1 | 4/2003 | Flannery et al. |
| 7,584,120 B1 * | 9/2009 | Yun et al. .................... 705/26.1 |

(Continued)

FOREIGN PATENT DOCUMENTS

| | | | |
|---|---|---|---|
| EP | 747847 | 11/1996 | |
| WO | WO 99/44165 | 9/1999 | ............. G06F 17/60 |
| WO | WO 99/52042 | 10/1999 | ............. G06F 17/30 |
| WO | WO 00/04475 | 1/2000 | ............. G06F 17/60 |

OTHER PUBLICATIONS

U.S. Appl. No. 60/219,101.*

(Continued)

*Primary Examiner* — Lalita M Hamilton
(74) *Attorney, Agent, or Firm* — Brian J. Teague

(57) ABSTRACT

An apparatus and method for service classification are provided. The apparatus and method make use of canonical service descriptions which designate minimum requirements for a service to be classified into a corresponding classification. Based on the canonical service description, it can be determined whether a service that wishes to be classified into a particular classification of a taxonomy on a service broker meets the minimum requirements for that classification. Furthermore, the use of canonical service descriptions ensures that all services classified into a particular classification have a minimum level of functionality that will allow them to function properly when invoked.

27 Claims, 9 Drawing Sheets

(56) References Cited

U.S. PATENT DOCUMENTS

2002/0002509 A1   1/2002  Wagorn et al.
2002/0010651 A1*  1/2002  Cohn et al. .................... 705/26
2002/0062265 A1*  5/2002  Poon ............................. 705/27

OTHER PUBLICATIONS

Vermeulen et al., *Software Agents Using XML for Telecom Service Modeling; A Practical Experience*, Proceedings of SGML/SML Europe '98. From Theory to New Practices, Paris, France, May 17-21, 1998, Abstract.

Syrbe et al, *An Enterprise-Level Analysis of Customer-Provide Implications for QoS Enforcement*, Proceedings Second International Enterprise Distributed Object Computing (Cat. No. 98EX244), La Jolla, CA, USA, Nov. 3-5, 1998; Abstract.

Dong, et al., *A New Industrial Classification System Based on Core Competence*, Systems Thinking, Globalization of Knowledge, and Communitarian Ethics. International Society for the Systems Sciences. Proceedings of the Forty-First Annual Meeting of the ISSS, Seoul, South Korea, Jul. 22-25, 1997, Abstract.

Viveros et al., *Visitors' Behavior: Mining Web Servers*, PADD97 Proceedings of the First International Conference on the Practical Application of Knowledge Discovery and Data Mining, London, UK, Apr. 23-25, 1997, Abstract.

Shimasaki, N., *Current Trends and the Near Future in the Information Networking Service Industries*, Abstract.

Wright et al., *Broadband Business Access: A Services Perspective on Network Termination Unit Port Requirements*, IEEE International Conference on Communications. BOSTONICC/89. World Prosperity Through Communications (Cat. No. 89CH2655-9), Boston, MA, USA, Jun. 11-14, 1989, Abstract.

Chatterjee et al., *Taxonomy for QoS Specifications*, 1997, pp. 100-107.

Martin et al., *An Object-Based Taxonomy for Distributed Computing Systems*, Aug. 1991, pp. 17-27.

Thachenkary et al., *Successful Product Characteristics for Electronic Commerce: A Taxonomy of Transaction Types*, 1997, pp. 77-85.

Guedes et al., *QoS Agency: An Agent-Based Architecture for Supporting Quality of Service in Distributed Multimedia Systems*, 1997, pp. 204-212.

Blight et al., *Policy-Based Networking Architecture for QoS Interworking in IP Management*, pp. 813-826.

Metso et al., *Content Model for Mobile Adaptation of Multimedia Information*, 1999, pp. 39-44.

Wolisz et al., *Service Provider Selection in an Open Services Environment*, 1990, pp. 229-235.

U.S. Appl. No. 60/215,807, filed Jul. 5, 2000.

U.S. Appl. No. 60/219,101, filed Jul. 18, 2000.

Vodickova, "Ceskoslovenska Informatika: On the Question of Information System Elements Categorization", vol. 24, Issue 12, 1982, pp. 345-347.

Baron et al., "Web-based E-catalog Systems in B2B Procurement", Communications of the ACM, vol. 43, Issue 5, May 2000, pp. 93-100.

Soumen Chakrabarti, Byron, Dom, Rakesh Agrawal, Prabhakar Raghavan; Scalable feature selection, classification and signature generation for organizing large text databases into hierarchical topic taxonomies; The VLDB Journal—The International Journal of Very Large Data Bases vol. 7, Issue 3 ISSN:1066-8888, pp. 163-178, Aug. 1998.

* cited by examiner

FIG. 5

```xml
<?xml version="1.0"?>
<definitions name="StockQuoteServiceCSD"
targetNamespace="http://www.financialWebServiceStandards.org/StockQuoteService"
xmlns:xsd="http://www.w3.org/1999/XMLSchema/"
xmlns:soap="http://schemas.xmlsoap.org/wsdl/soap/"
xmlns:csd="http://schemas.xmlsoap-org/wsdl/extensions/csd"
xmlns:uddi="http://www.uddi-org/schemas/wsdl/extensions"
xmlns="http://schemas.xmlsoap.org/wsdl/">
<message       name="SymbolRequest">
    <Part name="symbol" type="xsd:string"/> </message>
<message       name="QuoteResponse">
<Part name="quote" type="xsd:string"/>
</message>
<portType name="StockQuoteServicePortType">
    <operation name="getQuote">
<input message="SymbolRequest"/>
<output message="QuoteResponse"/>
    </operation> </portType>
<binding       name="StockQuoteServiceBinding"
    type="StockQuoteServiceType">
    <soap:binding style="rpc" transport="http://schemas.xmlsoap.org/soap/http"/>
    <operation name="getQuote">
<soap:operation soapAction="http://www.getquote.com/GetQuote"/>
<input>
<soap:body     use="literal"
    namespace="urn:live-stock-quotes"
    encoding="http://schemas.xmlsoap.org/soap/encoding/"/>
</input>
<Output>
<soap:body     use="literal"
    namespace="urn:live-stock-quotes"
    encoding="http://schemas.xmlsoap.org/soap/encoding/"/>
</output>
</operation>
<csd:testService>
<service name="StockQuoteTestService">
    <documentation>Stock Quote Binding Cannonical Service Definition test service</documentation>
<Port name="CSD Test" binding="StockQuoteServiceBinding">
    <soap:address location="
www.financialWebServiceStandards.org/soap/servlet/rpcrouter"/>
</port>
</service>
</csd:testService>
<csd:categorization>
<uddi:categoryBag>
<keyedReference tModelKey= "urn:
www.financialWebServiceStandards.org/taxonomies/equityInstruments" keyName=
"equityInstruments>equities>quotes>nonRealTimeQuotes" keyvalue= "" />
</uddi:categoryBag>
    </csd:categorization> </binding>
</definitions>
```

APPARATUS AND METHOD FOR CATEGORIZING SERVICES USING CANONICAL SERVICE DESCRIPTIONS

RELATED APPLICATIONS

This application is related to similar subject matter as co-pending and commonly assigned U.S. patent application Ser. Nos. 09/655,196, entitled "APPARATUS AND METHOD FOR E-BUSINESS SERVICE BROKERAGE", filed Sep. 5, 2000; 09/753,964, entitled "APPARATUS AND METHOD FOR VERIFYING CATEGORIZATION OF SERVICES USING CANONICAL SERVICE DESCRIPTION TESTS", filed on even date herewith; and 09/753,701, entitled "SERVICE TAXONOMY CRAWLER APPARATUS AND METHOD", filed on even date herewith, each of which are hereby incorporated by reference.

BACKGROUND OF THE INVENTION

1. Technical Field

The present invention is directed to an apparatus and method for categorizing services using canonical service descriptions. More specifically, the present invention is directed to an apparatus and method for electronic business (e-business) service categorization for use with an electronic service broker in order to place e-business services into categories within taxonomies that are searchable at run time.

2. Description of Related Art

A world in which a myriad of e-business services connect and collaborate with one another over the Internet is fast becoming a reality. Business-to-business (B2B) service interactions already exist using a variety of schemes that range from very rigid point-to-point Electronic Data Interchange (EDI) interactions to open Web auctions, e.g., Ariba, Chemdex, eSteel, and eBay. Thousands of businesses have already made some of their IT services available to their customers or partners on the Web. Most of these services are intended for use from a browser. But with technology such as WIDL from webMethods (www.webmethods.com), many of the Web-enabled services can also participate in B2B collaborations.

Known e-business services collaborate without any overarching vision or architecture. Techniques for B2B collaboration vary from one case to another. As the number and type of e-business services grows, the ability of an e-business consumer to locate and contact a provider of an e-business service will become increasingly difficult. Today, there is no vendor neutral architectural mechanism for classifying e-business services such that an e-business service consumer can locate and contact a provider of a desired e-business service. Thus, it would be beneficial to have an apparatus and method for classifying services in such a manner as to make them searchable and usable at run-time.

SUMMARY OF THE INVENTION

The present invention provides an apparatus and method for service classification. The present invention makes use of canonical service descriptions which designate minimum requirements for a service to be classified into a corresponding classification. Based on the canonical service description, it can be determined whether a service that wishes to be classified into a particular classification of a taxonomy on a service broker meets the minimum requirements, in terms of functionality and application program interface (API), for example, for that classification. Furthermore, the use of canonical service descriptions ensures that all services classified into a particular classification have a minimum level of functionality that will allow them to function properly when invoked.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is an exemplary diagram illustrating a canonical service description in accordance with the present invention;

DETAILED DESCRIPTION OF THE PREFERRED EMBODIMENTS

Figure 1:
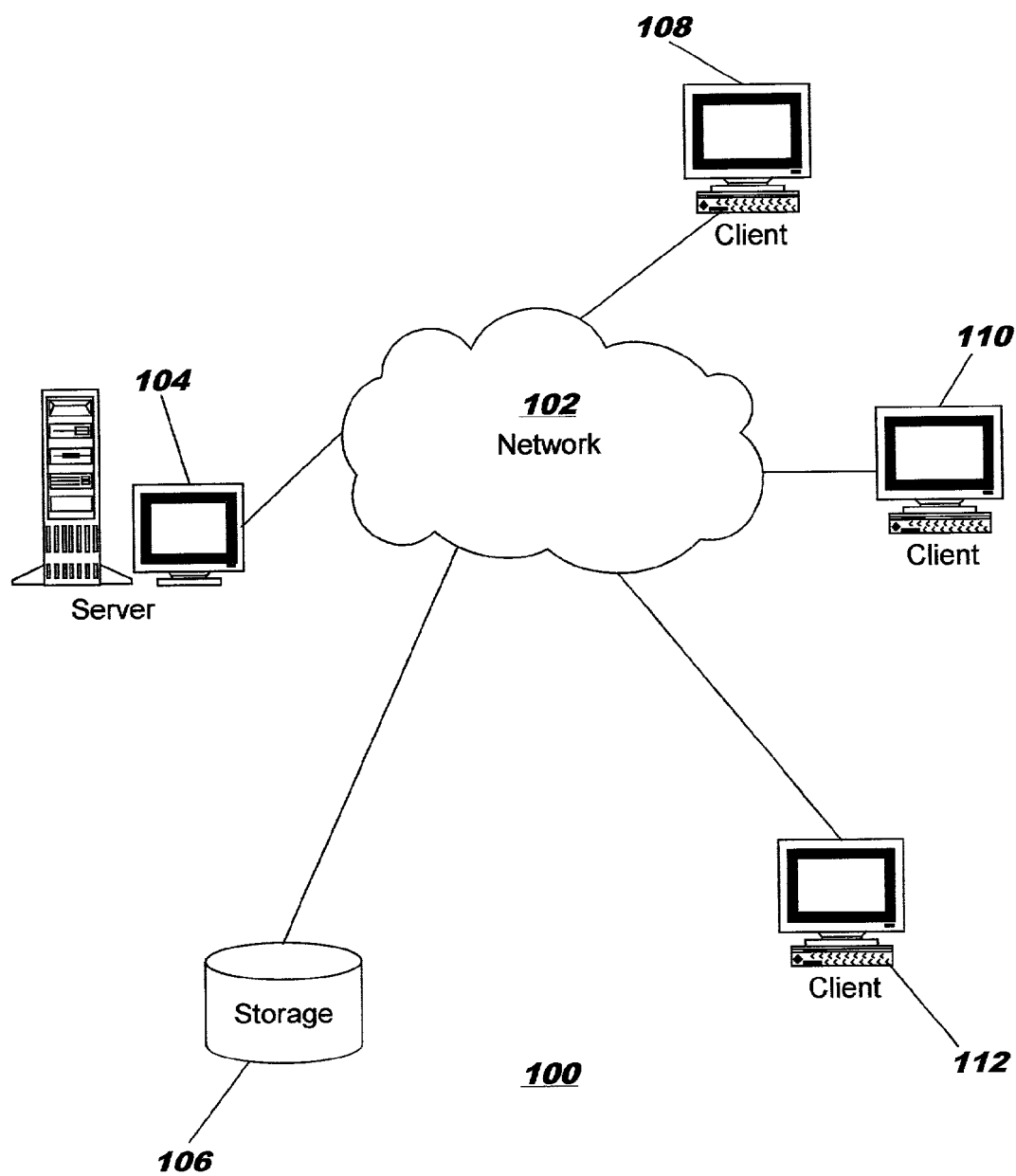
FIG. 1 is a diagram illustrating a distributed data processing system according to the present invention.

With reference now to the figures, and in particular with reference to FIG. 1, a pictorial representation of a distributed data processing system is depicted in which the present invention may be implemented. Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be any type of computing device capable of sending and/or receiving information via the network 102. For example, the clients may be personal computers, network computers, personal digital assistants, Internet capable cellular telephones, and the like. For purposes of this application, a network computer is any computer coupled to a network which receives a program or other application from another computer coupled to the network. In the depicted example, server 104 provides data, such as boot files, operating system images and applications, to clients 108-112. Clients 108, 110 and 112 are clients to server 104.

Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network. FIG. 1 is intended as an example and not as an architectural limitation for the processes of the present invention.

Figure 2:
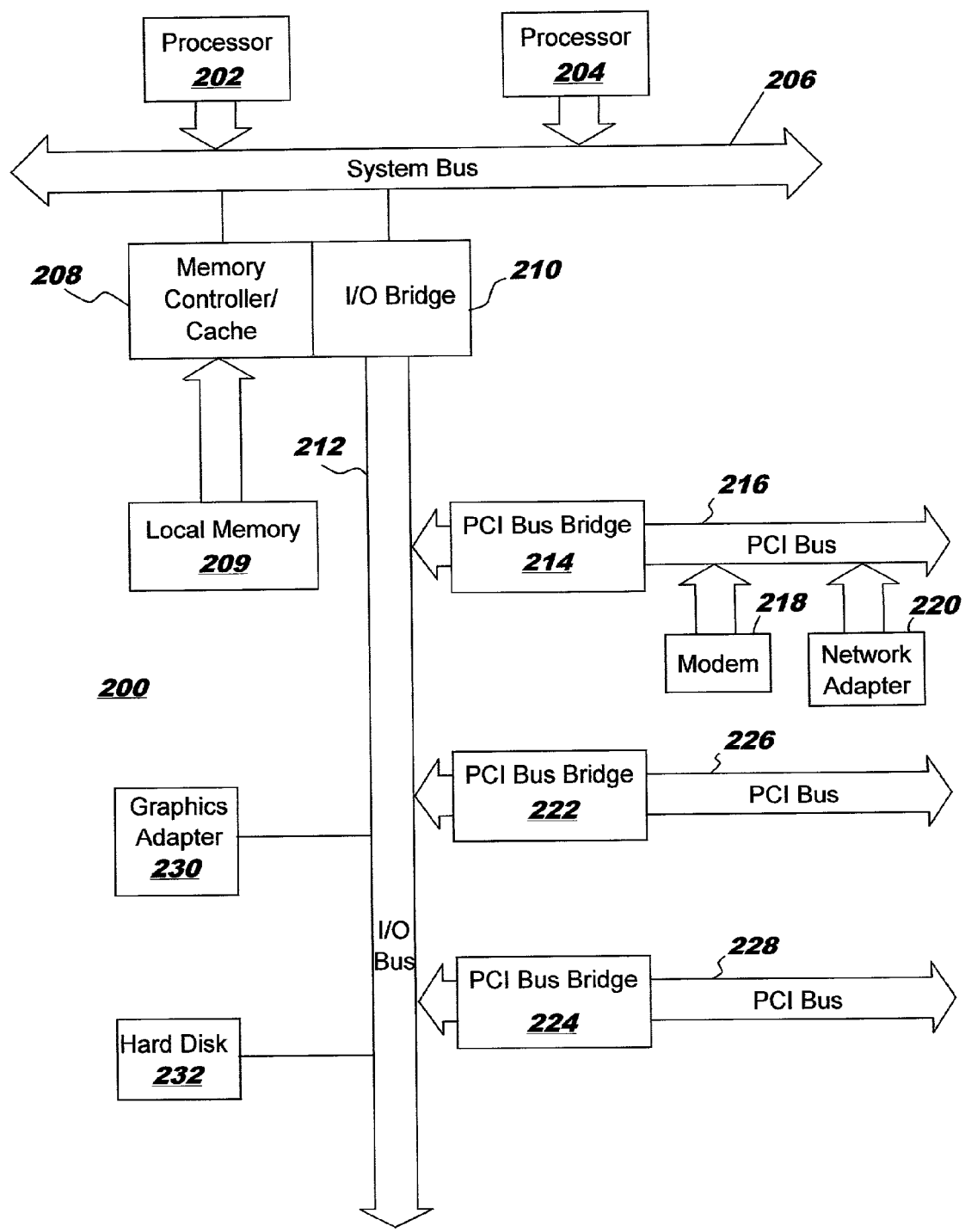
FIG. 2 is an exemplary block diagram of a server according to the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000, a product of International Business Machines Corporation in Armonk, N.Y., running the Advanced Interactive Executive (AIX) operating system.

Figure 3:
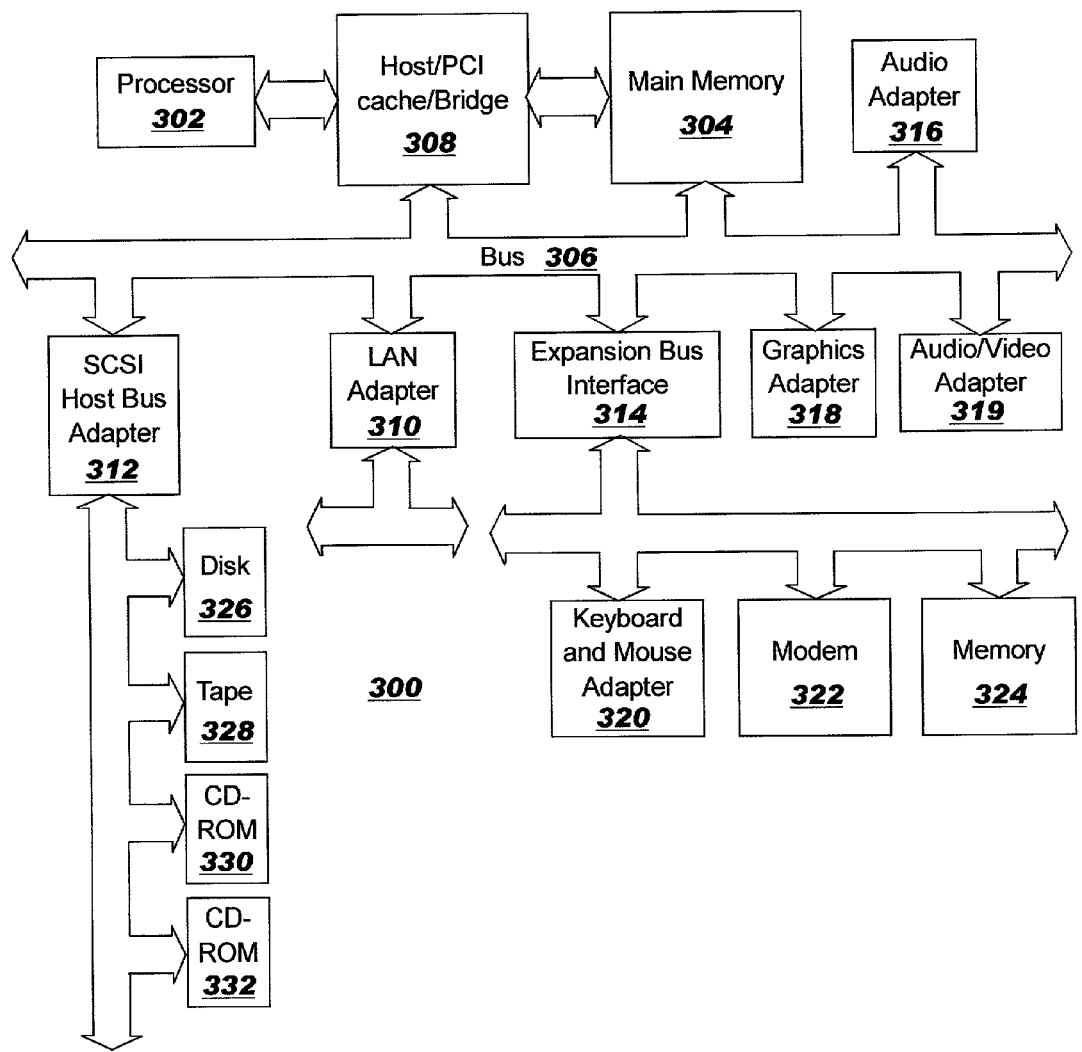
FIG. 3 is an exemplary block diagram of a client according to the present invention.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used.

Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324.

In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Linux, which is available from International Business Machines Corporation. An object oriented programming system, such as JAVA (a trademark of Sun Corporation), may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

The present invention provides an apparatus and method for categorizing services, e.g., e-business services, such that the categories of services may be searched to identify a supplier of a desired service. Based on the categorization of services, brokers may be established for providing a brokerage service to identify service providers.

With the present invention, a service provider may register with one or more brokers to thereby publicize the availability of their services. When a service consumer wishes to make use of a service, the consumer contacts a broker, provides the criteria of the service desired, and instructs the broker to find a compatible provider of the desired service. The broker may then provide the service consumer with information indicating how to contact the service provider.

Figure 4:
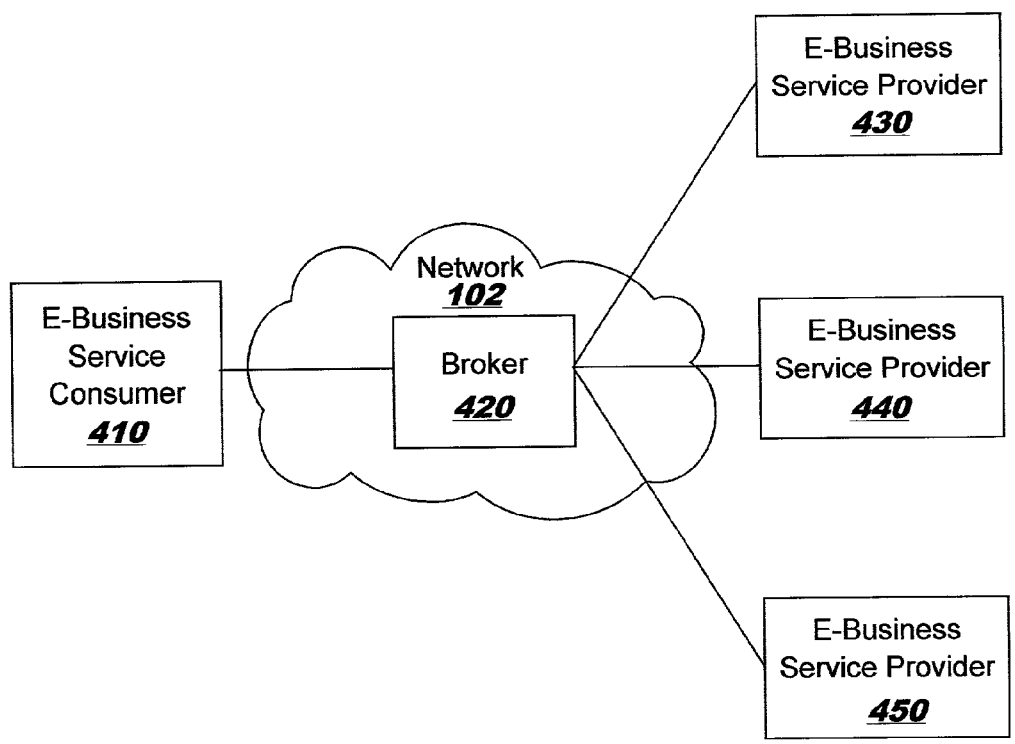
FIG. 4 is an exemplary block diagram illustrating the interaction of e-business service consumers with e-business service providers via a broker.

FIG. 4 is an exemplary block diagram illustrating the interaction of service consumers with service providers via a broker in accordance with the present invention. With the present invention, service consumer 410 is a requester of services, server providers 430-450 are suppliers of services, and broker 420 facilitates service consumers identifying compatible service providers.

The service consumer 410 may be any type of device that makes use of services available via the network 102. For example, the service consumer 410 may be a client device, such as client devices 108-112 in FIG. 1.

The description of the present invention refers to "services" which are requested by service consumers and supplied by service providers. The term "services" means any service that satisfies a business agenda of the service consumer. The "service" may collaborate with applications and services of other consumers, providers, and organizations. A service may be, for example, credit card authorization, credit report ranking, printing a document, applying postage to the document, and any other service that may be provided or contracted for via a network.

The service consumer 410 sends requests for services to the broker 420 via the network 102. The request is properly formatted so that the broker 420 may determine the category of service which is being requested by the service consumer 410. Based on the request and request parameters, the broker 420 identifies one or more service providers that satisfy the request, if any compatible service providers are registered with the broker 420, in a manner described hereafter. The service consumer may then select a service provider from those identified and obtain, from the broker 420, information identifying the manner by which the service consumer may contact and obtain the requested service from the service provider.

The service providers 430-450 may be implemented as any device coupled to the network 102 that is capable of providing or contracting for a service based on requests received over the network 102. The broker 420 is any type of device that is capable of receiving service requests from a service consumer 410, identify a service provider that provides the requested service, and provides contact information to the service consumer via the network 102. The service providers 430-450 and the broker 420 may be implemented, for example, in a server apparatus, such as server 104.

In order to maximize the benefit of services offered via a large and varying network environment, such as the Internet, a unified organizing principle must be adopted by which service consumers may be made aware of services that are available and the providers of these services. The present invention provides an architecture by which services may be categorized in such a manner as to facilitate informing consumers of the availability of services and their providers.

Categorization according to the present invention makes use of one or more taxonomies created and supported by each broker. The taxonomies are hierarchical in nature to reflect commonalties larger than the individual species. Just as with biological taxonomies, there is more than one way to categorize species of services and hence, there may be more than one possible taxonomy into which a service is classifiable. Because there may be many different possible taxonomies into which a service may be classified, a service provider may need to register its services with multiple brokers, each broker supporting a different taxonomy into which the service may be classified.

The service provider decides, at registration time, in which category, or categories, the service is to be registered. For example, if the service is air conditioning repair, the service provider may decide to register the service in a category of a taxonomy identified by home>repair>air-conditioning or household>equipment>air-conditioning>repair, or the like.

Each category of a taxonomy must define the semantics, i.e. what the services in the category do, as well as the application program interface (API) used to communicate with the service providers, i.e. how to invoke the services. In order to provide such classifications, a canonical service description (CSD) may be used to describe each classification. The CSD provides a mechanism by which a service may be classified that is recognizable by all parties to the service brokerage transaction. That is, the CSD based classification is recognized by the service consumer, the broker, and the service providers.

All services in a category must implement the canonical service description for that category, although they may do more than is provided in the CSD, i.e. the CSD provides the minimum requirements for a service to be classified into a corresponding category.

The use of CSDs that define the minimum requirements for services in a category provides a mechanism that facilitates searching of taxonomies at runtime. At runtime there is little, if any, interaction with a human user. Thus, in order to perform searching of categories in a taxonomy to identify services, a mechanism is needed by which to perform the search. This mechanism is the CSD.

With the present invention, an automatic search of the categories in a taxonomy is possible by searching for a matching CSD, i.e. a CSD that matches a requested CSD or provides minimum requirements corresponding to requirements of a search query. Such a search does not require input from a human user at runtime because each service categorized into a particular category is guaranteed to implement at least the functionality and APIs designated by the CSD of that category.

FIG. 5 illustrates an exemplary canonical service description. The canonical service description shown in FIG. 5 is provided in the extensible markup language (XML) and represents an example canonical service description for a stock quote service. The mechanism used for describing the canonical service description is the web services description language (WSDL), with CSD related extensions. The use of WSDL is standard, defining the "reusable" portion of a web service over the Simple Object Access Protocol (SOAP).

There are two main elements in the file that distinguish this file as a CSD description from other uses of WSDL to define "reusable" portions of a service description. These two elements are both defined within the CSD namespace extension to the WSDL language. CSD-related elements are inserted into a WSDL using the standard extension mechanism defined in the WSDL language.

The example shown in FIG. 5 defines a StockQuoteBinding CSD, for use in defining the standard web services interface definition for stock quoting. Organizations may use this CSD as the template for defining "API standard" stock quote web services.

The csd:testService element defines the specific service information of a service that provides validatable results. If a developer wishes to test an implementation of the stock quote web service, as will be discussed in greater detail hereafter, the developer may invoke the web service implementing the stockQuoteBinding and compare the results of this service by invoking the canonical test service for the CSD identified by the service definition described in the csd:testService element.

The csd:categorization element defines the category(s) in the taxonomy(s) in which implementations of the CSD should be placed. In this case, web services implementing this CSD are eligible to be inserted into the equity instruments taxonomy, defined by the financial WebServicesStandards organization, and into the category equityInstruments>equities>quotes>nonRealTimeQuotes.

The CSD shown in FIG. 5 is for illustration purposes only and is not intended to be limiting in any way. CSDs in accordance with the present invention may include other information in addition to, or in replacement of, the information shown in FIG. 5 without departing from the spirit and scope of the present invention.

The CSD provides a description of the service that is provided in such a manner as to be cognizable to the service consumer. The CSD includes service descriptions that are both human readable and machine parsable. For example, the CSD service descriptions may be implemented in the extensible markup language (XML) which is parsable by machines, a word processor formatted document, or the like. The CSDs also describe non-functional requirements, such as security and authentication assumptions, and other prerequisites considered to be common to all services in the category.

The CSD for each category is related to that of the category one level up. However, the semantics of a given service may differ from the next level up in important ways. That is, a specialization of a service at the next level down in the hierarchy may implement the same function, but do so in a very Indifferent way with different argument characteristics and different returned results from that of the next level up. Thus, the CSD describes how the services in the category differ from those in a parent category and any sibling categories in the taxonomy.

The CSDs may provide tests by which membership in the category may be determined. These tests may be provided as executable tests in XML, or other similar executable languages, for example. That is, when a service provider attempts to register its service with a broker, the broker may determine whether or not the service meets the minimum requirements of a chosen category based on the tests included in the corresponding CSD. The CSD tests allow a broker to objectively and automatically determine that a service satisfies the requirements for being included in a particular category.

The CSD test identifies messages that may be sent to the service provider and corresponding reply message that should be received from the service provider. These messages may be directed to various aspects of the service that is provided by the service provider. For example, these messages may be directed to security issues, privacy issues, and communication protocols used by the service.

When a service provider requests to have their service registered in a particular category of a taxonomy supported by a service broker, the service provider sends a request to the service broker identifying the category that the service is intending to be registered in as well as the APIs used by the service. The API description may include, for example, method names, parameter names, parameter types, executable API test suites, and the like, such that the service broker can determine whether the service implements what it claims to implement before registering it in a given category.

Upon receiving the registration request from the service provider, the service broker performs the tests associated with the CSD of the selected category. That is, the service broker sends the messages included in the tests to the service provider and monitors the reply messages received. The sending of the messages to the service provider is performed in view of the method name, parameter names, parameter types, etc. Included in the API description of the registration request. The service broker then matches the reply messages received to the "correct" reply messages included in the CSD test. If there is a match of the test messages, the service is verified as meeting the requirements of the CSD and the service is permitted to be registered in the selected category.

If the service implements exactly the API specified in the category's canonical service description, the service description included with the registration request need not provide any further tests. However, any additional functionality beyond the API specified in the CSD may be accompanied by additional tests. These additional tests are implemented in the same way as the CSD tests to confirm that the service provides the functions identified.

Security constraints on some services may require that the taxonomy server be given special certificates or other certification information as part of registration so that it can execute the tests. In situations that call for extreme security, authentication or encryption, the taxonomy server may only receive exceptions in response to the tests. Even in that case, though, it should receive the correct exceptions, i.e. the exception received should indicate that the service is present but not responding due to inadequate authentication.

If a service fails one or more of the tests in the CSD, or additional tests included in the registration request, the service provider may be provided with a report of which tests were satisfied and which tests failed. In this way, the service provider is provided with information by which the operator of the service provider may modify their service description and service functionality to conform to the requirements of the selected category.

Thus, the use of canonical service descriptions provides a mechanism by which services may be categorized and verified to meet the minimum requirements of the particular categories in which they are placed. Thus, if a service is to be registered with multiple taxonomies, the service is guaranteed to meet the minimum requirements of each category in which it is registered.

In order for the brokerage mechanism of the present invention to operate, service providers must first register with one or more brokers in accordance with the taxonomies supported by those brokers. In determining with which brokers to register, the service provider must balance the service consumer's desire to have a "target rich" environment with the need for the service provider to be "seen" in the right places. The balance of these two concerns results in the need for a service provider to examine the taxonomies supported by various brokers and register the service with those brokers, and in the appropriate categories, where service consumers are likely to look for the service.

Figure 6:
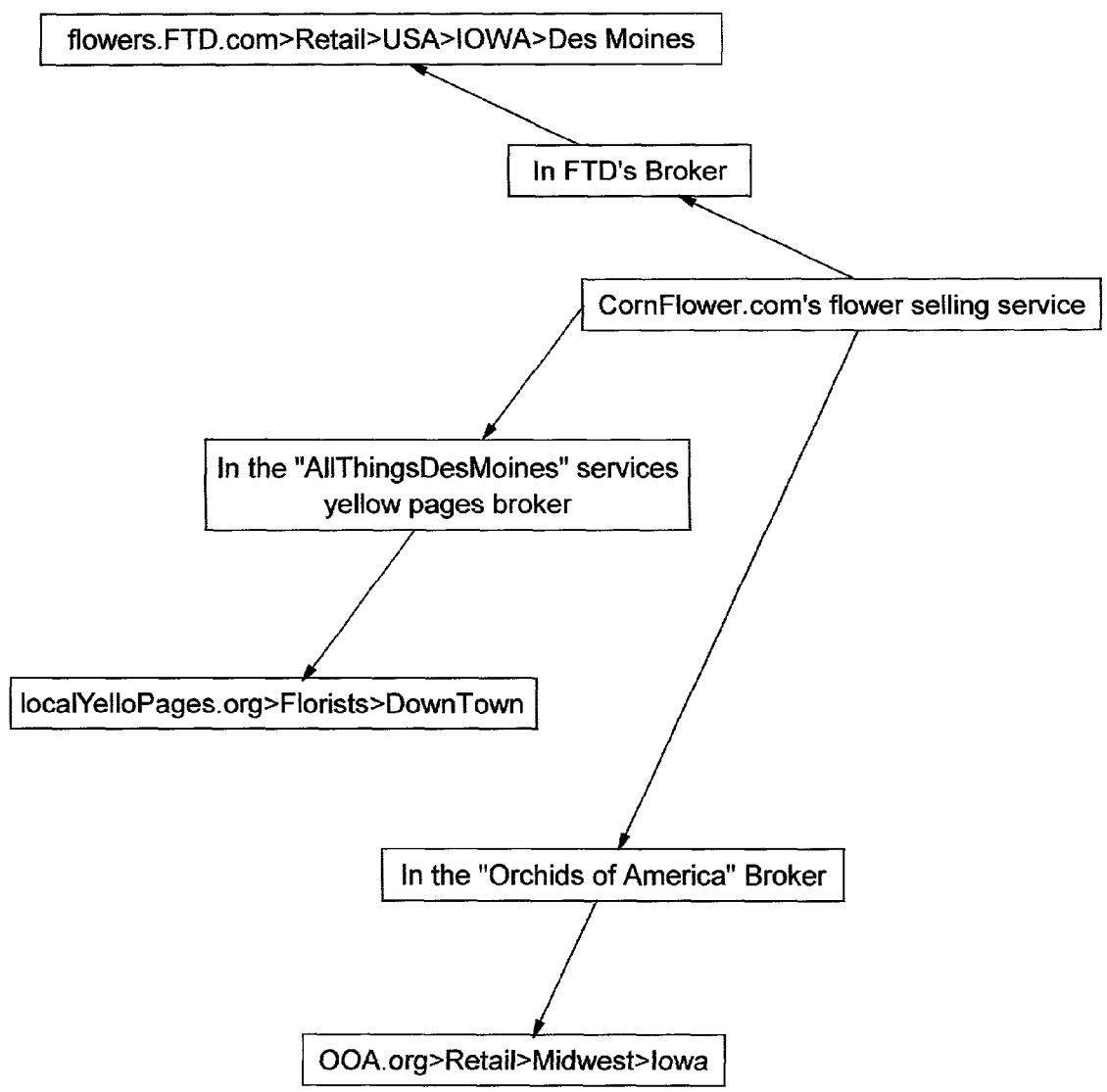
FIG. 6 is an exemplary diagram illustrating the registration of a service in multiple taxonomies of various service brokers.

As an example to illustrate the need to register with multiple brokers, consider a fictional small retail flower e-business in Des Moines, Iowa named "CornFlowers.com," as shown in FIG. 6. In addition to the general flower retailing business, CornFlowers.com specializes in growing and selling a number of varieties of orchids.

CornFlowers.com participates as a buyer in at least two B2B e-business markets. It buys most of its standard types of flowers over a B2B link with its primary wholesaler and it buys specialty items (e.g., accessories, balloons, vases and planters) from a florist supplies broker.

CornFlowers.com also wishes to provide flower selling e-business services to clients via the Internet. CornFlowers.com participates as a supplier in two industry-oriented brokers (FTD.com's industry broker and 5Flowers.com's industry broker). CornFlowers.com also wants to provide flower selling e-business services to other clients outside of the "big" flower brands (FTD, 5FLOWERS). As a result, CornFlowers.com wants to appear in flower-related e-marketplaces (e.g., for weddings and funerals) in the Des Moines area. CornFlowers.com is also active in Orchids of America, a special interest group concerned with the growing and marketing of orchids. It is in CornFlower.com's business interest to be visible as a provider of B2B services in this group as well.

Note that CornFlower.com's business success depends upon being listed in appropriate, but different, categories in several taxonomies supported by several different brokers. CornFlower.com wishes to be listed geographically in FTD and 5FLOWERs. It wishes to be listed by flowers in the Des Moines broker, and wishes to be listed by its specialized orchid varieties in the orchid broker. As a result, CornFlower.com registers its service in the flowers.FTD.com>Retail>USA>IOWA>Des Moines category of the taxonomy supported by the FTD broker, the localYellowPages.org>Florists>DownTown category in the taxonomy supported by the "AllThingsDesMoines" services yellow pages broker, and the OOA.org>Retail>Midwest>Iowa category in the Orchids of America broker.

In registering its service with a broker, the service provider submits a registration request to the broker. The registration request includes a service description, an API designation, and any other non-functional information pertinent to the invoking of the service. The API designation and non-functional information may be designated in terms of a model description. The model description identifies the address by which to contact the service provider, the protocols used to communicate with the service provider, security used by the service provider, authentication and privacy, as well as any other non-functional information.

The registration request further includes an indication of the categories within the taxonomies of the broker in which the described service may be categorized.

The determination whether to allow the registration in the requested categories may be made based on minimum requirements of the category, as designated by the corresponding canonical service description, in order to make sure the service to be registered is in conformance with other services already registered under the categories. These minimum requirements may include, for example, security issues, privacy issues, communication protocols, and the like, which are designated in a CSD.

The determination of whether or not the service to be registered meets the minimum requirements may be made by a human administrator of the service broker or automatically by the service broker itself based on canonical service description tests, as described above. If a service to be registered is identified as meeting the CSD requirements of a particular category, the service may be registered under that category. If the service to be registered is identified as meeting the CSD requirements of more than one category, the service provider may be provided with the option to register under one or more of the categories.

If a service to be registered is not identified as meeting the requirements of any category in the supported taxonomy, the service provider may be provided with the option to request that the service broker define a new category in which the service may be classified. The administrator of the service broker may then decide whether or not to support the new classification and reinform the service provider of the decision. If the administrator agrees to define a new classification, the service provider may then register its service with the service broker in a manner described above. Otherwise, the service provider will be unable to register its service with that particular service broker.

Once a service is registered with a service broker in the manner described above, the service is included in the list of services associated with the designated category of the service broker. By stating that the service is included in the list of services what is meant is that the service description and model submitted by the service provider is stored in memory in association with the categories in which the service was registered.

The service consumer may invoke a requested service by first contacting a service broker to identify a provider of the service, obtain the model description for the service provider, and then contact the service provider based on the model description to thereby obtain the requested service. In contacting the service broker, the service consumer sends a request for a service to the service broker. The service consumer may be associated with the service broker such that the request is directed specifically at the service broker, or the service request may be broadcast across the network 102 such that service brokers having registered service providers meeting the requirements of the service request may respond accordingly.

The service request uses the same service description semantics used by the service providers when submitting their services to the service brokers for registration. The service request is parsable by the service broker to thereby identify the categories in the supported taxonomy that may have registered services meeting the service request requirements. For example, the service request may include an identification of a taxonomy/category pair that is requested or may include a CSD description of a service requested.

When the service broker receives the service request, the service broker traverses the supported taxonomy to identify one or more service providers that may provide the requested service. For example, if a taxonomy/category pair is identified in the service request, only those services categorized into the identified category are investigated to determine if they match the requested service. Alternatively, if only a CSD description is provided, the entire taxonomy must be traversed to identify a service having the requested CSD.

Figure 7:
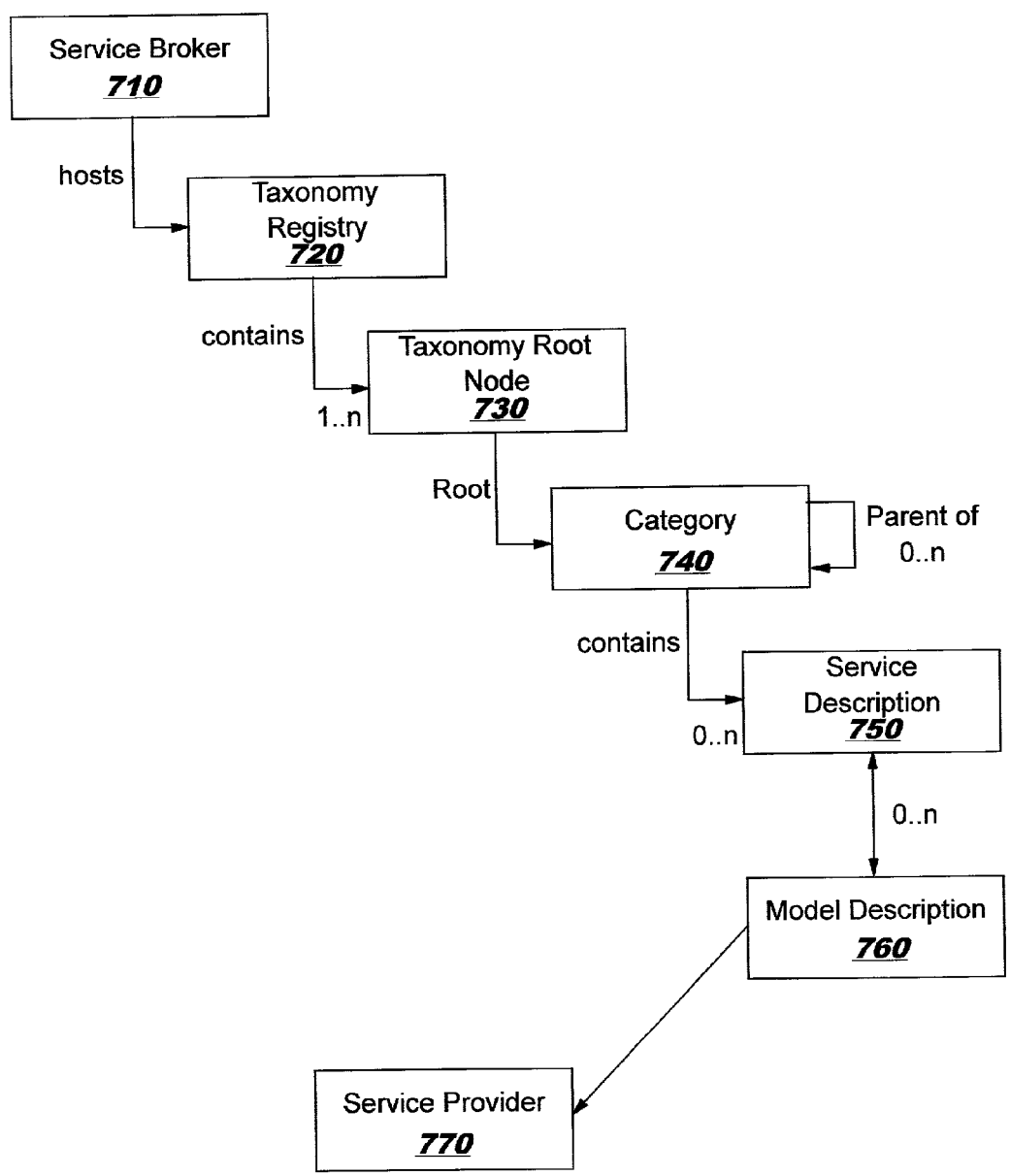
FIG. 7 is an exemplary diagram illustrating the hierarchical levels traversed in a service broker to identify an e-business service provider in accordance with the present invention.

FIG. 7 is an exemplary diagram illustrating the hierarchical levels traversed in a service broker to identify an e-business service provider in accordance with the present invention. As shown in FIG. 7, a service broker 710 hosts a taxonomy registry 720. The taxonomy registry 720 identifies the various 1 . . . n taxonomies supported by the service broker 710. The root node 730 represents the root of the 0 . . . n categories 740 within the taxonomy. Each category 740 contains 0 . . . n service descriptions 750 identifying registered services in that category. The service descriptions 750 have associated model descriptions 760. The model descriptions 760 provide the necessary information for contacting a service provider 770.

Thus, when searching registered services on a service broker 710, the service broker traverses each taxonomy corresponding to the taxonomy root nodes 730 in the taxonomy registry 720 and identifies a category 740 meeting the criteria of the service request. Alternatively, this crawling of the taxonomy may be based on an identified taxonomy/category pair in the service request received. The service broker 710 then identifies one or more service providers that provide the requested service based on the registered service descriptions 750 within the identified category 740. Alternatively, if non-uniform accepted service descriptions are used, the service broker 710 may return all service descriptions registered under a compatible category. The associated model description 760 may then be used by the service consumer to contact the service provider 770.

It is possible that there may be a plurality of registered services that meet the requirements of the service request. In such an instance, one of the compatible services may be chosen in either a specified or arbitrary way. For example, the service consumer may be presented with each of the possible candidates and allowed to select the service provider that it wishes to use. The service providers may be ranked based on prior use of the service providers and thus, a higher ranked service provider may be chosen. Service providers may be selected based upon priorities assigned to non-functional descriptive information included in either the service description or the model definition. Alternatively, a service provider may be selected randomly. Any mechanism by which one service provider may be chosen from a plurality of compatible service providers may be used without departing from the spirit and scope of the present invention.

As mentioned above, the identification of a service provider capable of providing the desired service may be performed at runtime. At runtime, there is no human judgment available to determine if a service matches a required business need. This is not a problem with the present invention since the taxonomy architecture of the present invention ensures that services in a particular classification will at least satisfy the business needs associated with the corresponding CSD's minimum requirements. Therefore, an automatic identification of a compatible service provider is possible based on the reclassification scheme of the present invention. No human intervention is required.

Thus, with the present invention, a service broker acts as a mediary between service consumers and service providers. Based on the categorization architecture of the present invention, a service registered with the service broker may be automatically identified based on the criteria in a service request, and corresponding contact information may be provided to the service consumer so that the service consumer may contact the service provider to obtain the desired service.

Figure 8:
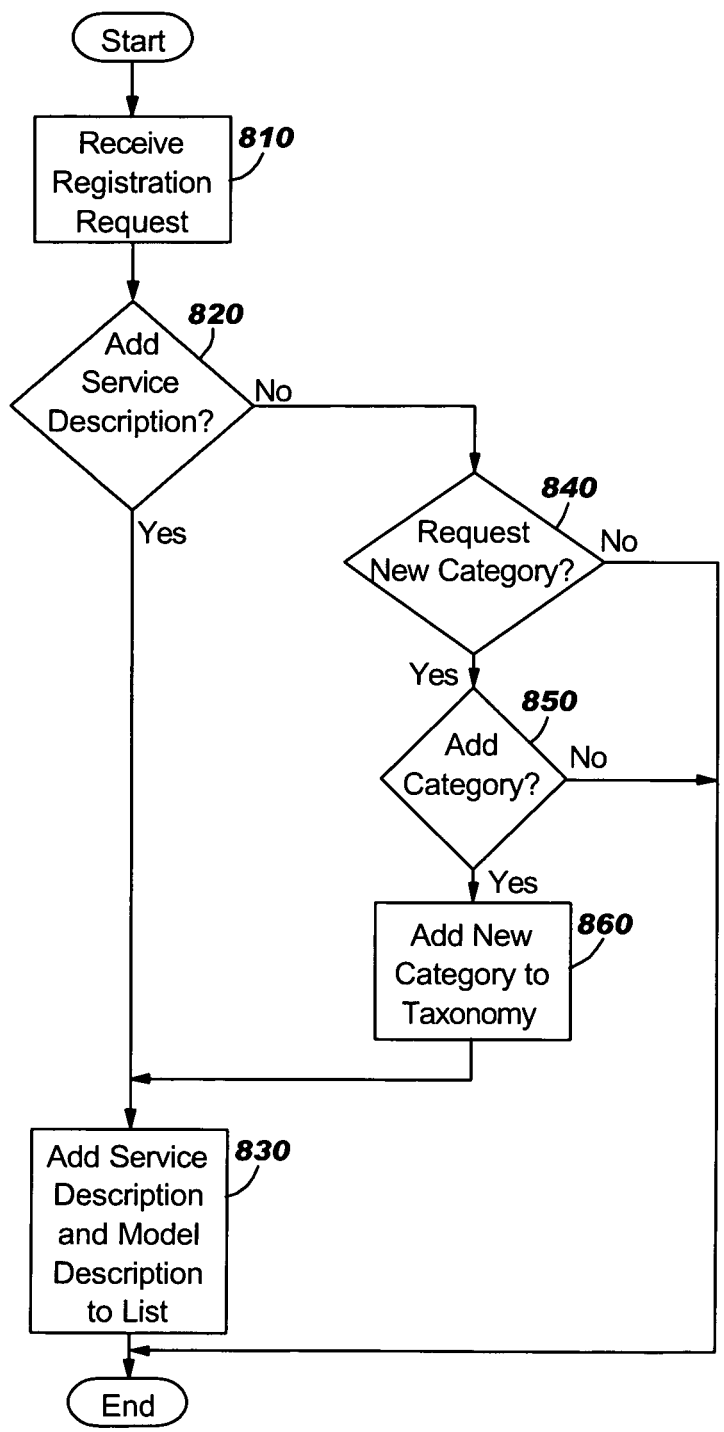
FIG. 8 is a flowchart outlining an exemplary operation of the present invention when registering a new service with a broker.

FIG. 8 is a flowchart outlining an exemplary operation of the present invention when registering a new service with a broker. As shown in FIG. 8, the operation starts with the a registration request being received (step 810). The registration request includes a service description and model description. A determination is made as to whether the service should be added to the registered services under the requested classifications (step 820). This determination may include determining if the service description of the service to be registered satisfies the minimum requirements of the requested classifications in the taxonomies supported by the service broker, as identified by corresponding canonical service descriptions. If the determination is that the service fits the canonical service description for the requested classification, the service description and model description are added to the list of services associated with the selected classification categories (step 830).

If the service description is not to be added to any of the requested classification categories, the service provider may be provided with the option to request a new category to be created (step 840). If the service provider does not request a new category, the operation ends. If the service provider does request a new category, a determination is made as to whether or not a new category should be added (step 850). If so, a new category is generated and added to the supported taxonomy (step 860). If a new category is not to be added, the operation ends.

Figure 9:
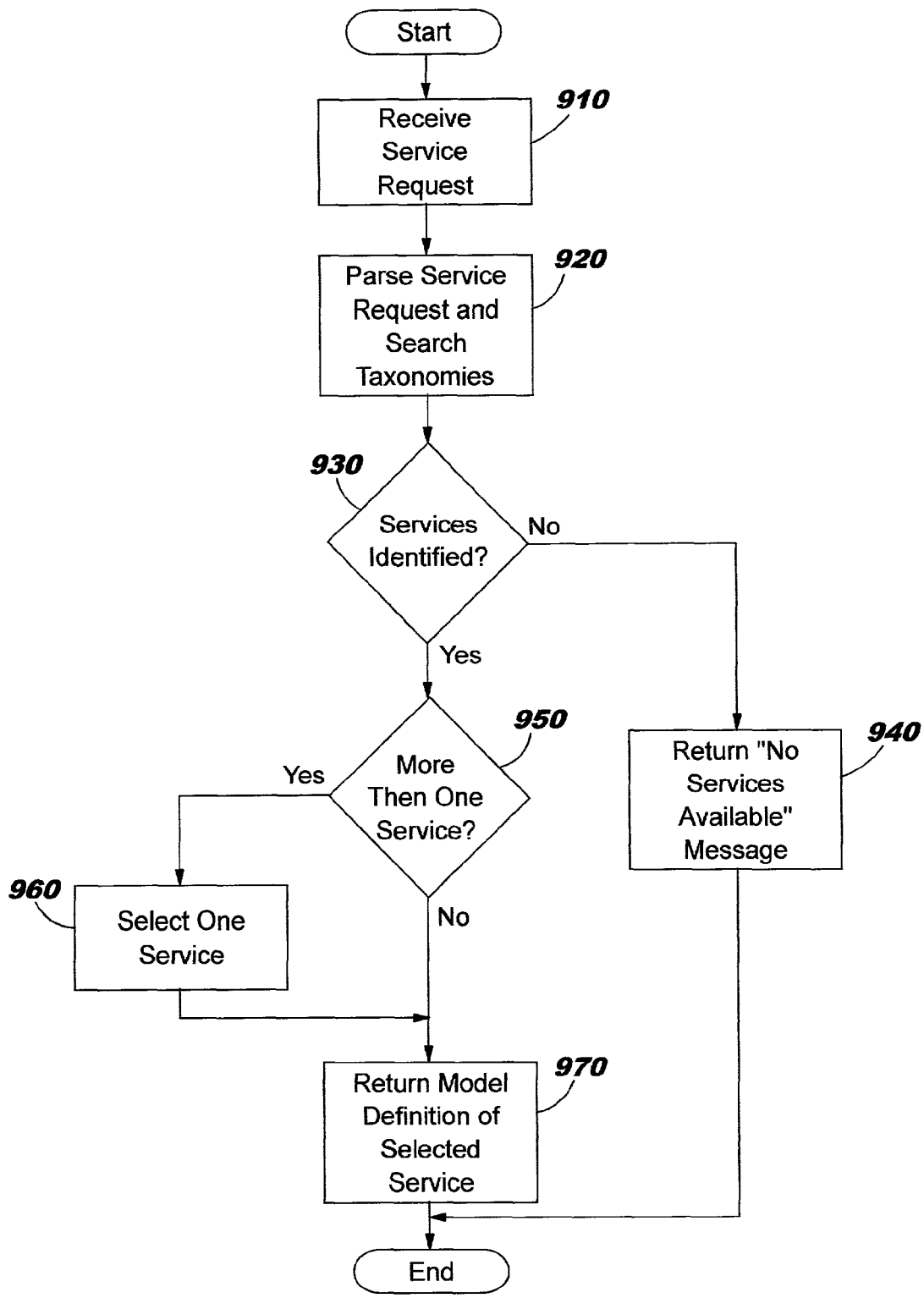
FIG. 9 is a flowchart outlining an exemplary operation of the present invention when identifying an e-business service provider based on the categorization of the present invention.

FIG. 9 is a flowchart outlining an exemplary operation of the present invention when processing a service request from a service consumer. As shown in FIG. 9, the operation starts with receiving a service request from a service consumer (step 910). The request includes a service description of the requested service. The service description in the service request is parsed (step 920) and the taxonomies supported by the service broker are searched to determine if any registered services meet the service description in the service request (step 930). If not, a "no services available" message is returned to the service consumer (step 940). If one or more services are identified, a determination is then made as to whether more than one service is identified (step 950). If so, one of the services is selected based on one or more selection schemes (step 960). Thereafter, or if only one service is identified, the model definition for the identified service is provided to the service consumer so that the service consumer may contact the service provider (step 970). The operation then ends.

Thus, the present invention provides a unified architecture for classifying services into taxonomies, and categories within these taxonomies, supported by service brokers in a network. The unified architecture makes use of canonical service descriptions for purposes of classification and to assure that services meet a minimum requirement for respectively categories within the taxonomies. In addition, the canonical service descriptions may provide executable tests which may be used to verify a service as meeting minimum requirements for a classification as well as provide a mechanism by which compatible classifications may be identified to a service provider.

Based on this architecture, service consumers may send service requests to service brokers in order to identify those service providers that are capable of providing a desired service. The service brokers may then provide contact information to the service consumer such that the consumer may contact the service provider to obtain the desired service.

As a further embodiment of the present invention, the canonical service description tests describe above may be used as a mechanism for identifying categories in which a service may be registered. For example, consider the scenario of a service provider sending a registration request to a service broker identifying a particular category in which a particular service is to be registered. If the service fails the CSD tests required for registration in the selected category, the service broker may look to other similar categories to determine if the service may meet the CSD tests of these other similar categories.

For example, the service broker may look to sibling, parent and/or child categories, within a certain range of the selected category in the taxonomy. The CSD tests associated with these categories may be applied to the service that is to be registered and a determination as to whether the service satisfies the minimum requirements of these categories may be made. If the service does meet the minimum requirements of one or more of these categories, these categories may be identified to the service provider so that the service provider may be given the option to select one of these categories for registration of the service.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, of registering services in a taxonomy, comprising:

receiving a registration request at the data processing system, the registration request including a service description and an identification of a category within the taxonomy in which the service is to be registered;

determining, by a processor of the data processing system, if the service description should be registered in the identified category based on a canonical service description associated with the category;

registering, by a processor of the data processing system, the service description in the identified category using the data processing system if the determination is that the service description should be registered in the identified category; and if it is determined that the service description should not be registered in the category, determining, by a processor of the data processing system, whether a request to add a new category is received.

2. The method of claim 1, wherein the canonical service description identifies minimum criteria for the category.

3. The method of claim 1, wherein registering the service description in the category includes storing the service description and an associated model description in a storage in association with the category.

4. The method of claim 1, wherein the method is implemented in a service broker within at least one network.

5. The method of claim 1, wherein if a request to add a new category is received, a determination is made as to whether to add the new category, and wherein if the new category is added, the service description is registered in association with the new category.

6. The method of claim 1, wherein the canonical service description includes information identifying minimum requirements of the category regarding one or more of security requirements, privacy requirements and communication protocol requirements.

7. The method of claim 1, wherein if it is determined that the service description should not be registered in the category, the method further comprises:

searching the taxonomy for an alternate category in which the service description should be registered; and registering the service description in the alternate category.

8. The method of claim 7, wherein searching the taxonomy for an alternate category includes searching one or more of sibling, parent and child categories of the identified category within a predetermined range of the identified category in the taxonomy.

9. The method of claim 7, wherein searching the taxonomy for an alternate category includes searching the taxonomy for a category in which the service description meets requirements of a canonical service description associated with the alternate category.

10. A computer program product in a non-transitory computer readable medium for registering services in a taxonomy, comprising:

first instructions for receiving a registration request, the registration request including a service description and an identification of a category within the taxonomy in which the service is to be registered;

second instructions for determining if the service description should be registered in the identified category based on a canonical service description associated with the category;

third instructions for registering the service description in the identified category if the determination is that the service description should be registered in the identified category; and fourth instructions for determining whether a request to add a new category is received if it is determined that the service description should not be registered in the category.

11. The computer program product of claim 10, wherein the canonical service description identifies minimum criteria for the category.

12. The computer program product of claim 10, wherein the third instructions for registering the service description in the category includes instructions for storing the service description and an associated model description in a storage in association with the category.

13. The computer program product of claim 10, wherein the computer program product is executed in a service broker within at least one network.

14. The computer program product of claim 10, further comprising fifth instructions for determining whether to add the new category, if a request to add a new category is received, and sixth instructions for registering the service description in association with the new category, if the new category is added.

15. The computer program product of claim 10, wherein the canonical service description includes information identifying minimum requirements of the category regarding one or more of security requirements, privacy requirements and communication protocol requirements.

16. The computer program product of claim 10, further comprising:

fifth instructions for searching the taxonomy for an alternate category in which the service description should be registered if the result of execution of the second instructions is that the service description should not be registered in the category; and sixth instructions for registering the service description in the alternate category if an alternate category is identified by execution of the fourth instructions.

17. The computer program product of claim 16, wherein the fifth instructions for searching the taxonomy for an alternate category includes instructions for searching one or more of sibling, parent and child categories of the identified category within a predetermined range of the identified category in the taxonomy.

18. The computer program product of claim 16, wherein the fifth instructions for searching the taxonomy for an alternate category includes instructions for searching the taxonomy for a category in which the service description meets requirements of a canonical service description associated with the alternate category.

19. An apparatus for registering services in a taxonomy, comprising:

means for receiving a registration request, the registration request including a service description and an identification of a category within the taxonomy in which the service is to be registered;

means for determining if the service description should be registered in the identified category based on a canonical service description associated with the category;

means for registering the service description in the identified category if the determination is that the service description should be registered in the identified category; and means for determining whether a request to add a new category is received if it is determined that the service description should not be registered in the category.

20. The apparatus of claim 19, wherein the canonical service description identifies minimum criteria for the category.

21. The apparatus of claim 19, wherein the means for registering the service description in the category includes means for storing the service description and an associated model description in a storage in association with the category.

22. The apparatus of claim 19, wherein the apparatus is part of a service broker within at least one network.

23. The apparatus of claim 19, further comprising means for determining whether to add the new category, if a request to add a new category is received, and means for registering the service description in association with the new category, if the new category is added.

24. The apparatus of claim 19, wherein the canonical service description includes information identifying minimum requirements of the category regarding one or more of security requirements, privacy requirements and communication protocol requirements.

25. The apparatus of claim 19, further comprising:
means for searching the taxonomy for an alternate category in which the service description should be registered if the means for determining indicates that the service description should not be registered in the category; and
means for registering the service description in the alternate category if an alternate category is identified by the means for searching.

26. The apparatus of claim 25, wherein the means for searching the taxonomy for an alternate category includes means for searching one or more of sibling, parent and child categories of the identified category within a predetermined range of the identified category in the taxonomy.

27. The apparatus of claim 25, wherein the means for searching the taxonomy for an alternate category includes means for searching the taxonomy for a category in which the service description meets requirements of a canonical service description associated with the alternate category.

* * * * *